June 22, 1965

F. P. WARRICK 3,191,183

HIGH-SPEED PRECISION DATA CAMERA

Filed May 18, 1959

INVENTOR.
FREDERICK P. WARRICK
BY
Barnes, Kisselle, Raisch & Choate
ATTORNEYS

June 22, 1965  F. P. WARRICK  3,191,183
HIGH-SPEED PRECISION DATA CAMERA
Filed May 18, 1959  3 Sheets-Sheet 2

INVENTOR.
FREDERICK P. WARRICK
BY
Barnes, Kisselle, Raisch & Choate
ATTORNEYS

June 22, 1965 F. P. WARRICK 3,191,183
HIGH-SPEED PRECISION DATA CAMERA
Filed May 18, 1959 3 Sheets-Sheet 3

INVENTOR.
FREDERICK P. WARRICK
BY
Barnes, Kisselle, Raisch & Choate
ATTORNEYS

United States Patent Office 3,191,183
Patented June 22, 1965

3,191,183
HIGH-SPEED PRECISION DATA CAMERA
Frederick P. Warrick, Clarkston, Mich., assignor to McDonnell Aircraft Corporation, St. Louis, Mo., a corporation of Maryland
Filed May 18, 1959, Ser. No. 813,731
10 Claims. (Cl. 352—119)

This invention relates to high-speed cameras and particularly to cameras which are adapted to record the movement of a rapidly moving object.

In designing rapidly moving objects such as aircraft and missiles, it is customary to study the performance of such objects or components thereof by mounting them on a sled which guides their movement in a predetermined path along a track and observing their operation during this movement. In order to record such high speed performance, it has been customary to locate cameras at predetermined intervals along the track which are adapted to record and make a moving picture of the action of the objects. Since the objects are moving at very high speeds, as for example from 200 to 3500 feet per second, the length of time that an object will be in the field of any particular camera is quite limited and the length of film exposed in any particular camera is short. However, since the entire time consumed in traveling along the track is short, it has been considered necessary to start the cameras at the beginning of the test and permit them to run continuously in order to insure that each camera will record the movement of the object past the camera. It can be appreciated that it may thus become necessary to use a substantial quantity of film in each camera. Only a very small portion thereof will contain any images of the moving object. In addition to the obvious waste of film, which in the case of color film results in substantial cost, the valuable time of experienced personnel is used in editing the film in order to obtain the usable portion thereof.

It is therefore an object of this invention to provide a high-speed precision data camera which utilizes a very short length of film but will definitely insure recording of the movement of the object being tested.

It is a further object of the invention to provide such a camera having a 35 millimeter or larger frame size.

In accordance with the invention, a plurality of cameras of particular design are located at spaced intervals along a track and the cameras are electrically connected so that as the sled bearing the object being tested moves along the track it triggers each camera in the succession at the proper instant to thereby insure that the camera will record the movement of the object past its aperture.

Figure 2:
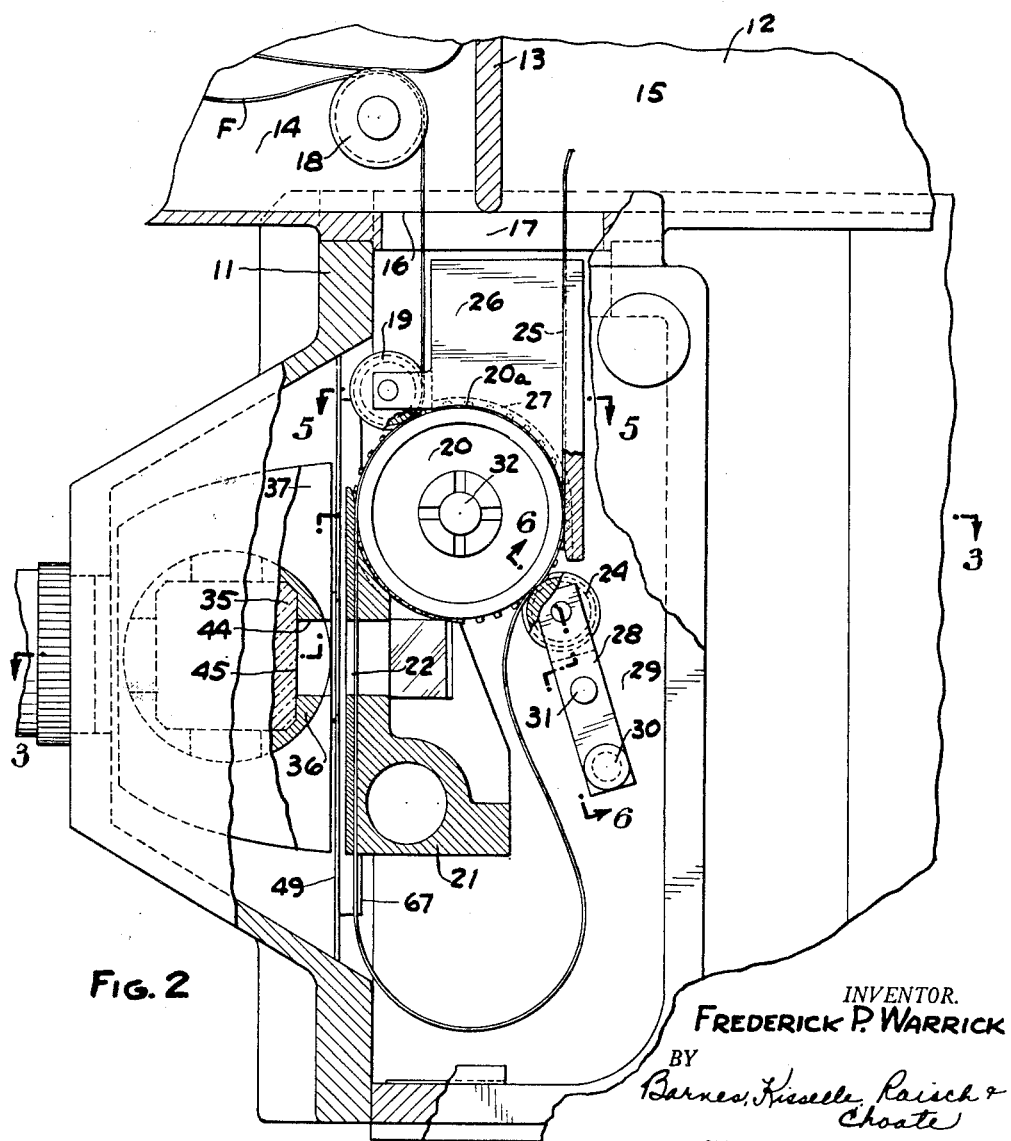
FIG. 2 is a longitudinal vertical sectional view along the axis of the lens.

Referring to the accompanying drawings, camera 10 comprises a housing 11 on which a magazine 12 is removably mounted. As shown in FIG. 2, magazine 12 includes an intermediate wall 13 which divides the magazine into a supply compartment 14 and a take-up compartment 15 having openings 16, 17, respectively, communicating with the interior of the camera housing. Film housing 12 is light tight and is mounted on the camera in a light-tight relationship thereto.

A strip of film F in random looped relationship in the supply compartment 14 is passed over an idler roll 18 in the compartment through opening 16 into the camera housing. The film is then threaded between an idler roll 19 and a sprocket 20 having teeth 20a thereon for engaging the perforations of the film strip. The sprocket 20 is driven as presently described to feed the film downwardly through a vertically slitted block 21 having an aperture 22 therein.

Figure 6:
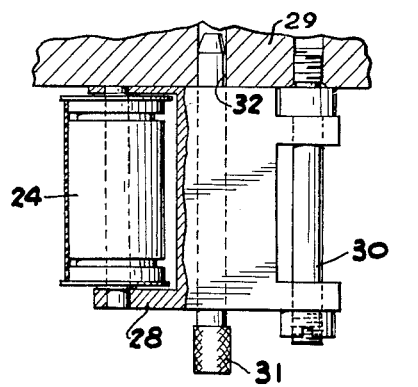
FIG. 6 is a fragmentary sectional view taken along the line 6—6 in FIG. 2.

The film then forms a loop below the aperture block 22 and is threaded between an idler roll 24 and another peripheral portion of sprocket 20 and passes upwardly through a slit 25 in a guide block 26, through opening 17 and then into the take-up compartment 15 of the film magazine 12. Block 26 is provided with curved grooves 27 which provide a clearance for the teeth 21 on the sprocket 20. Idler roll 24 is rotatably mounted on a lever 28 which is pivoted on intermediate and longitudinal wall 29 of the camera housing as at 30. Lever 28 is locked in position holding idler roll 24 adjacent the periphery of sprocket 20 by a pin 31 which engages an opening 32 in intermediate wall 29 (FIG. 6). When the pin 31 is retracted from opening 32, it permits the lever 28 to be pivoted away from the sprocket 20 and thereby facilitates the threading of the film upwardly through slit 25.

Figure 3:
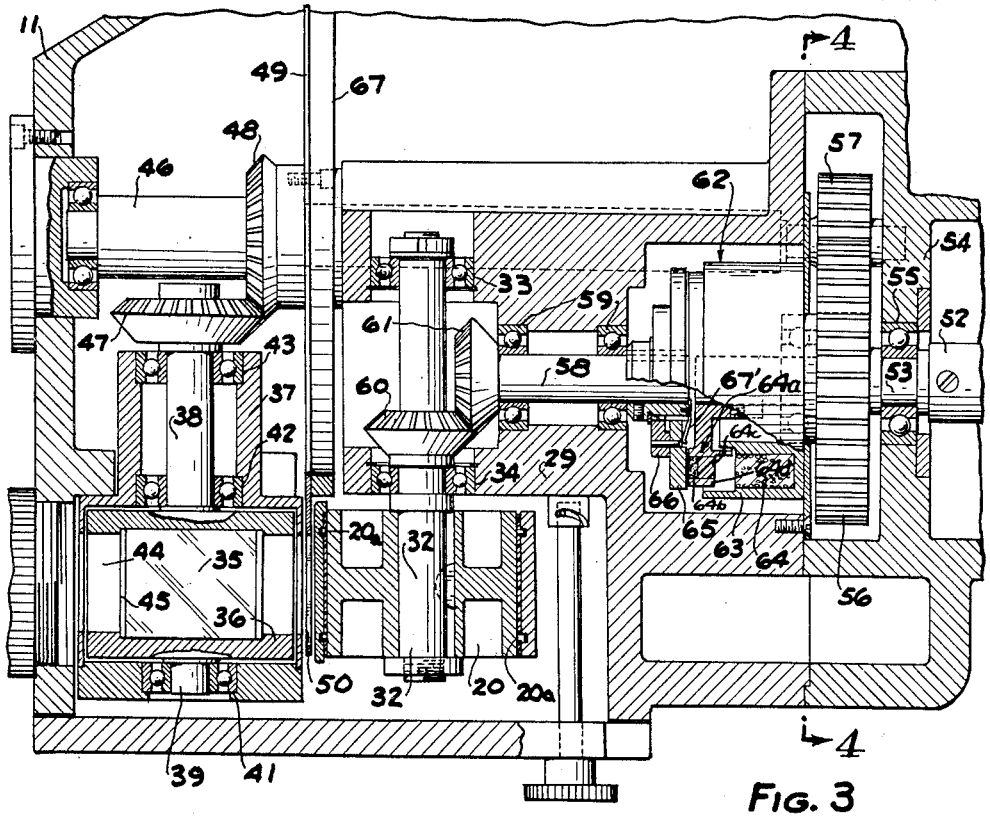
FIG. 3 is a fragmentary sectional view taken along the line 3—3 in FIG. 2.
Figure 4:
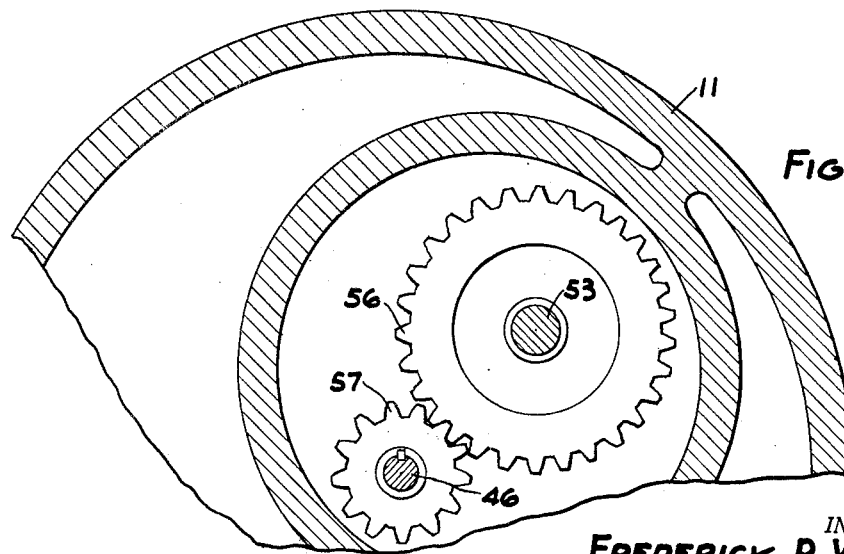
FIG. 4 is a fragmentary sectional view taken along the line 4—4 in FIG. 3.
Figure 5:
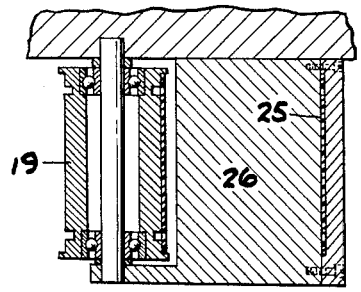
FIG. 5 is a fragmentary sectional view taken along the line 5—5 in FIG. 2.

Referring to FIG. 3, sprocket 20 is keyed to a shaft 32 which is rotatably mounted in intermediate wall 29 by spaced ball bearings 33, 34.

As shown in FIGS. 2 and 3, a polygonal prism 35 is mounted in a cage 36 for rotation about an axis transverse to the axis of aperture 22. Cage 36 is rotatably mounted within a housing 37 mounted in intermediate wall 29. Aligned stub shafts 38, 39 on the cage 36 are journalled on opposite end portions of housing 37 by ball bearings 42, 43 and 41, respectively.

Cage 36 is generally cylindrical and is provided with a plurality of rectangular openings 44 in the cylindrical wall thereof. The axes of openings 44 are perpendicular to the faces 45 of prism 35. As the cage 36 and prism 35 are rotated clockwise as viewed in FIG. 2, the prism causes successive images to be directed from the camera lens to the exposure area or aperture 22 and travel in the direction of movement of the film.

Cage 36 and prism 35 are rotated as a unit by a shaft 46 through bevel gears 47, 48 keyed to shafts 38, 46 respectively. Shaft 46 is journalled in the camera housing with its axis parallel to and spaced from the axis of the camera aperture 22. A shutter 49 in the form of a disc is fixed on shaft 46 and is provided with a plurality of regularly spaced openings 50 which are adapted to be successively brought into registry with the aperture of the camera to expose successive portions of film which are passing past the aperture.

Figure 1:
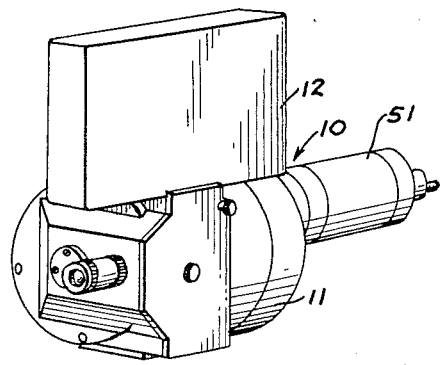
FIG. 1 is a perspective view of a camera embodying the invention.

The shaft 46 is driven by a motor 51 (FIG. 1). The motor shaft 52 is coupled to a stub shaft 53 journalled in a transverse wall 54 of the camera housing by ball bearing 55 (FIG. 3). A gear 56 keyed to the shaft 53 meshes with a smaller gear 57 keyed to shaft 46. When the motor 51 is energized, the shaft 46 is continuously rotated thereby continuously rotating the shutter 49 and the prism 35. The shutter and prism are thus operating to direct successive images toward the exposure area as more fully described in my copending application entitled High Speed Camera, Serial No. 627,012, filed December 7, 1956, now Patent No. 2,952,183.

In accordance with the invention, provision is made for rotating the sprocket 20 only during a predetermined interval of time while motor 51 is running. In this way film is fed past the camera aperture only during the short period of time when the object to be photographed is traveling past the camera. The means for rotating sprocket 20 includes a short shaft 58 journalled by ball bearings 59 in the camera housing. Shaft 58 extends longitudinally of the camera and is parallel to shaft 46. A driving connection is formed between the shafts 32, 58 by bevel gear 60 on shaft 32 which meshes with bevel gear 61 on the adjacent end of shaft 58.

A clutch 62 adjacent the other end of shaft 58 provides a driving connection between shafts 53 and 58 when energized. Clutch 62 is of the electromagnetic type and includes a housing 63 mounted on the camera body. A coil 64 is mounted in housing 63 and surrounds a core 64a fixed to the shaft 53. An armature plate 65 is mounted for axial movement on a member 66 fastened to the shaft 58. The armature plate 65 is yieldingly urged axially out of engagement with core 64a by a leaf spring 67'. When the coil 64 is energized, the armature 65 is drawn axially of the shaft 58 into magnetic locking engagement with core 64a to form a driving connection between shaft 53 and shaft 58. Core 64a includes a ring 64b of friction material adjacent armature 65. Core 64a comprises an inner ring mounted on the shaft 53 and an outer ring 64d separated from the inner ring by the friction material 64b and plastic 64c. In this manner, the outer ring 64d is electrically insulated from the inner ring to insure the flow of flux between the armature 65 and the housing 63 when the coil 64 is energized.

In order to insure that the sprocket 20 will maintain the desired speed, a fly wheel member 67 of substantial mass is mounted on the shutter 49. Thus when motor 51 is rotating shutter 49, and the driving connection to the sprocket 20 is made by energizing clutch 62, the large inertia of fly wheel 67 prevents any substantial lowering of the speed of rotation of the motor.

Figure 7:
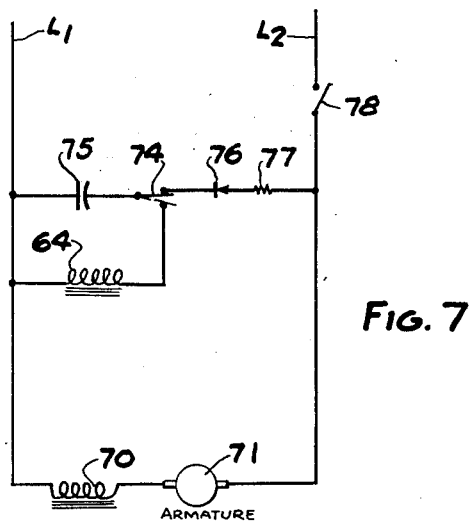
FIG. 7 is a wiring diagram of the camera embodying the invention.

The wiring diagram for each camera is shown in FIG. 7 and includes a source of alternating current applied to lines $L_1$, $L_2$. Capacitor 75 is in series with a half wave rectifier 76 and a limiting resistor 77. When the switch 78 is closed, current is supplied to the field winding 70 and armature 71 of the motor of the camera. In addition, a capacitor 75 is charged to a direct current voltage. A switch 74 is actuated by movement of the object along the track, thereby connecting the capacitor 75 across the coil 64 of the clutch and providing a rapid current build up in the clutch coil 64. This current decays rapidly, but is of sufficient duration to insure that the film has been driven through the camera. The coil 64 then comes deenergized.

Figure 8:
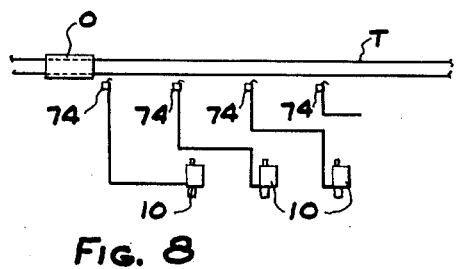
FIG. 8 is a diagram of the camera apparatus for recording the movement of an object.

Referring to FIG. 8 which is a diagram of the camera apparatus, in use, a plurality of cameras 10 embodying the invention are located at spaced points along the track T which defines the path of travel of the object O being tested. The switches 74 which control the clutches of the respective cameras are located at spaced points along the track in advance of the respective cameras.

At the beginning of the run, current is supplied to the motor 51 of each camera so that the motor rotates continuously thereby continuously rotating the prism 35 and shutter 49 of each camera.

As the test begins and the object moves along the track on the test sled, the sled successively closes switches 74. As each switch 74 is closed, it causes the clutch 62 of its respective camera to be energized thereby driving the sprocket 20 and feeding a relatively short length of film through the camera. Since the action of each camera is controlled by movement of the sled, it is assured that the camera will record the passage of the object.

Although the initial engagement of the clutch will cause a slight reduction in speed of the motor, I have found that the speed is not reduced a substantial amount and even the first few frames of the length of film are almost full size. As a result, because of the high speed at which the object being photographed is moving past the camera, only a relatively short length of film is needed to record the movement of the object. In most instances, a length of 10 feet is more than adequate where the film speed ranges from about ten to seventy feet per second, or about 300 to 1200 35 mm. frames per second. It is thus necessary to only use a few feet of film for each camera as contrasted to a full reel of film. This not only results in a substantial saving in the cost of the film but in addition, considerable time is saved in processing and editing.

I claim:

1. In a camera for photographing the movement of an object moving past a predetermined point at a high speed, the combination comprising means forming an aperture which defines an exposure area, means for feeding a strip of film past said aperture, lens means for forming an image, means for directing successive images toward said exposure area and moving said images in the direction of movement of said film across said exposure area, drive means for continuously operating said latter means at a substantially constant speed, clutch means operable to establish a driving connection between said drive means and said strip feeding means at a time when said drive means and said image directing and moving means are operating and said strip feeding means is at rest, the inertia of said drive means and said image directing and moving means being substantially greater than the inertia of said strip feeding means so that the speed of operation of said drive means and said image directing and moving means is substantially unaffected when said driving connection is established.

2. The combination set forth in claim 1 wherein said image directing and moving means comprise a polygonal prism having spaced parallel surfaces mounted adjacent said exposure area against which said lens means directs an image, and a cage supporting said prism for rotation about its axis.

3. The combination set forth in claim 1 wherein said strip feeding means comprises a sprocket positioned in advance of said exposure area and having teeth thereon for engaging the perforations of a strip of film past the exposure area.

4. In a camera for photographing the movement of an object moving past a predetermined point at a high speed, the combination comprising a housing having an aperture which defines an exposure area, a sprocket mounted for rotation in said housing in advance of said aperture about an axis generally parallel to the plane of said aperture and having teeth thereon adapted to engage the perforations of a strip of film and thereby move the film past said aperture when rotated, a polygonal prism having spaced parallel surfaces mounted adjacent said aperture with its axis parallel to the plane of said aperture and perpendicular to the direction of movement of the film past said exposure area, a cage supporting said prism for rotation about its axis, means for directing an image onto said polygonal prism whereby when the prism is rotated successive images are directed to the exposure area and moved in the direction of movement of said film across said aperture, a substantially constant speed motor mounted on said housing, a disc type shutter mounted adjacent said exposure area for rotation about an axis generally perpendicular to the plane of said exposure area and adapted to move across said exposure area, means forming a driving connection between said motor, said shutter and said cage, and clutch means for establishing a driving connection between said sprocket and said motor when said sprocket is at rest and said motor is operating for driving said sprocket in synchronism with said cage and shutter, the inertia of said motor, shutter, cage and prism being substantially greater than the inertia of said clutch and sprocket so that the speed of rotation of the motor is substantially unaffected when said driving connection is established.

5. The combination set forth in claim 4 wherein said means forming a driving connection between said motor, said shutter and said cage comprises a first shaft mounted for rotation in said housing, said motor having a drive shaft extending at a generally right angle to the axis of rotation of said sprocket and said cage and parallel to the axis of said first shaft, means forming a driving connection between said drive shaft and said first shaft.

6. The combination set forth in claim 5 wherein said means forming a driving connection between said drive shaft and said sprocket comprises a second shaft axially aligned with said drive shaft, a clutch between said drive shaft and said second shaft, a third shaft on which said sprocket is fixed, and means forming a driving connection between said second shaft and said third shaft.

7. In a camera for photographing the movement of an object moving past a predetermined point at a high speed, the combination comprising a housing having an aperture which defines a substantially flat exposure area, a sprocket mounted for rotation in said housing in advance of said aperture about an axis generally parallel to the plane of said aperture, said sprocket having teeth thereon adapted to engage the perforations of a strip of film and thereby move the film past said aperture when rotated, first guide means associated with said sprocket for maintaining a portion of said film in contact with said sprocket in advance of the aperture and second guide means associated with said sprocket for maintaining another portion of said film in contact with said sprocket beyond said aperture, a polygonal prism having spaced parallel surfaces mounted adjacent said aperture with its axis parallel to the plane of said aperture and perpendicular to the direction of movement of the film past said exposure area, means for supporting said prism for rotation about its axis, lens means for directing an image onto said polygonal prism whereby when the prism is rotated successive images are directed to the exposure area and are moved in the direction of movement of the film across said exposure area, a disc type shutter mounted adjacent said exposure area for rotation about an axis perpendicular to the plane of said exposure area and adapted to move across said exposure area, a substantially constant speed motor mounted on said housing, means forming a driving connection between said motor, said shutter, and said polygonal prism, and magnetic clutch means forming a driving connection between said sprocket and said motor when said sprocket is at rest and said motor is operating for driving said sprocket in synchronism with said prism and said shutter, the inertia of said first-mentioned driving connection and said motor, prism and shutter being substantially greater than the inertia of said clutch and said sprocket, so that the speed of rotation of said motor, prism and shutter is substantially unaffected when said driving connection is established.

8. The combination set forth in claim 7 including means associated with said housing providing a supply compartment for a randomly looped strip of film adjacent said first guide means, and means associated with said housing adjacent said second guide means providing a take-up compartment for randomly receiving said strip of film.

9. The combination set forth in claim 7 wherein said shutter supports a flywheel fixed thereto to increase the inertia thereof.

10. In a camera apparatus for photographing the movement of an object, the combination comprising a plurality of cameras, each said camera comprising a housing having an aperture which defines an exposure area, a sprocket mounted for rotation in said housing in advance of said aperture about an axis generally parallel to the plane of said aperture and having teeth thereon adapted to engage the perforations of a strip of film and thereby move the film past said aperture when rotated, a polygonal prism having spaced parallel surfaces mounted adjacent said aperture with its axis parallel to the plane of said aperture and perpendicular to the direction of movement of the film past said exposure area, a cage supporting said prism for rotation about its axis, means for directing an image onto said polygonal prism whereby when the prism is rotated successive images are directed to the exposure area and moved in the direction of movement of said film across said aperture, a substantially constant speed motor mounted on said housing, a disc type shutter mounted adjacent said exposure area for rotation about an axis generally perpendicular to the plane of said exposure area and adapted to move across said exposure area, means forming a driving connection between said motor, said shutter and said cage, and clutch means for establishing a driving connection between said sprocket and said motor when said sprocket is at rest and said motor is operating for driving said sprocket in synchronism with said cage and shutter, the inertia of said motor, shutter, cage and prism being substantially greater than the inertia of said clutch and sprocket so that the speed of rotation of the motor is substantially unaffected when said driving connection is established, and means individual to each said camera and responsive to the movement of an object toward said camera for actuating the clutch for its respective camera so that the strip feeding means of said cameras are operating successively.

References Cited by the Examiner
UNITED STATES PATENTS

| | | | |
|---|---|---|---|
| Re. 9,960 | 12/81 | Muybridge | 95—1 |
| 995,061 | 6/11 | Duhem | 352—195 |
| 1,978,500 | 10/34 | Meyer | 95—11.5 |
| 2,091,357 | 8/37 | Goldsmith | 346—141 |
| 2,194,808 | 3/40 | Pooley | 88—24 |
| 2,269,862 | 1/42 | Rose | 178—6 |
| 2,417,076 | 3/47 | Hickman | 352—116 |
| 2,906,162 | 9/59 | Taylor | 95—11 |
| 2,952,183 | 9/60 | Warrick | 352—119 |
| 2,967,211 | 1/61 | Blackstone et al. | 88—1 |

JULIA E. COINER, *Primary Examiner.*

EMIL G. ANDERSON, *Examiner.*